US006690375B2

(12) United States Patent
Ogawa et al.

(10) Patent No.: US 6,690,375 B2
(45) Date of Patent: Feb. 10, 2004

(54) LINE SEGMENT DETECTOR

(75) Inventors: Shigetaka Ogawa, Tokyo (JP); Koitiro Hirao, Tokyo (JP); Takahiro Hongu, Tokyo (JP); Tamotsu Kusaka, Tokyo (JP)

(73) Assignee: NEC Corporation, Tokyo (JP)

( * ) Notice: Subject to any disclaimer, the term of this patent is extended or adjusted under 35 U.S.C. 154(b) by 107 days.

(21) Appl. No.: 10/097,102

(22) Filed: Mar. 14, 2002

(65) Prior Publication Data

US 2002/0154121 A1 Oct. 24, 2002

(30) Foreign Application Priority Data

Mar. 15, 2001 (JP) ...................................... 2001-074135

(51) Int. Cl.[7] ............................................... G06T 11/20

(52) U.S. Cl. ....................... 345/443; 345/441; 345/673; 345/582

(58) Field of Search ................................ 345/441, 443, 345/673, 582; 382/202

(56) References Cited

U.S. PATENT DOCUMENTS

| | | | | |
|---|---|---|---|---|
| 5,583,985 A | * | 12/1996 | Kohiyama et al. | 345/534 |
| 5,748,199 A | * | 5/1998 | Palm | 345/473 |
| 5,809,170 A | * | 9/1998 | Saito | 382/203 |
| 5,818,458 A | * | 10/1998 | Saito | 345/441 |
| 5,844,532 A | * | 12/1998 | Silverbrook et al. | 345/89 |
| 5,936,869 A | * | 8/1999 | Sakaguchi et al. | 703/1 |
| 6,246,417 B1 | * | 6/2001 | Kambe et al. | 345/619 |
| 6,275,214 B1 | * | 8/2001 | Hansen | 345/158 |

FOREIGN PATENT DOCUMENTS

| | | |
|---|---|---|
| JP | 8-237475 A | 9/1996 |

* cited by examiner

*Primary Examiner*—Matthew C. Bella
*Assistant Examiner*—Manucher Rahmjoo
(74) *Attorney, Agent, or Firm*—Foley & Lardner

(57) ABSTRACT

A line segment detector includes a first weighted average section which calculates the weighted average of pixel values in a first detecting window. The detector also includes a second weighted average section which calculates the weighted average of pixel values in a second detection window. A differentiating section calculates the absolute value of a difference between the outputs of the first and second weighted average sections. A dot detecting section calculates the average of absolute differential values between pixels in a vertical line direction, a horizontal line direction, and diagonal directions set in a detection window in an area containing the target pixel. If the difference between outputs of the dot detecting section and the differentiating section is larger than a threshold, it is determined that a portion near the target pixel is a vertical line image, a horizontal line image, or a diagonal image,

16 Claims, 7 Drawing Sheets

FIG. 2A
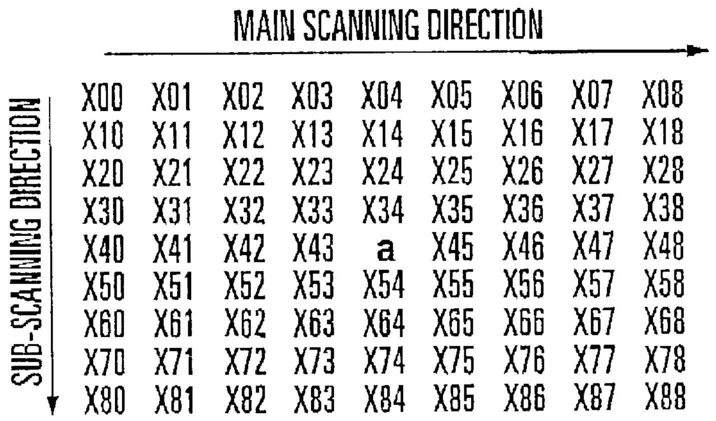
FIG. 2B
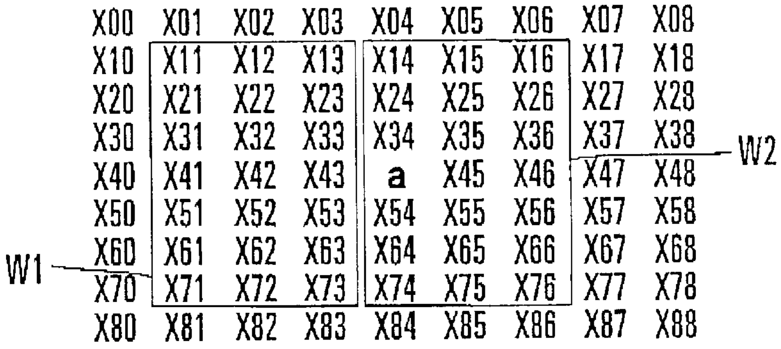
FIG. 2C
| | | | | | |
|---|---|---|---|---|---|
| 1 | 1 | 1 | -1 | -1 | -1 |
| 2 | 2 | 2 | -2 | -2 | -2 |
| 3 | 3 | 3 | -3 | -3 | -3 |
| 3 | 3 | 3 | • -3 | -3 | -3 |
| 3 | 3 | 3 | -3 | -3 | -3 |
| 2 | 2 | 2 | -2 | -2 | -2 |
| 1 | 1 | 1 | -1 | -1 | -1 |
/45
FIG. 2D
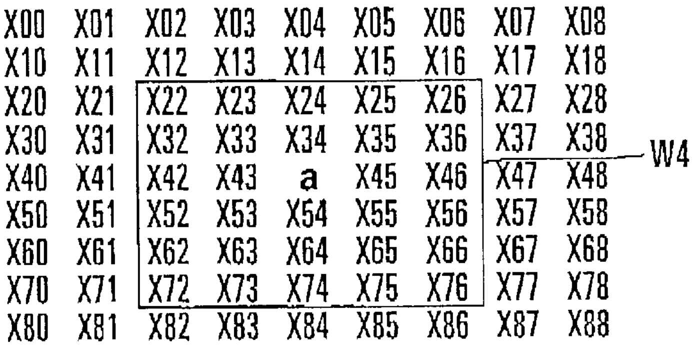

FIG. 3A
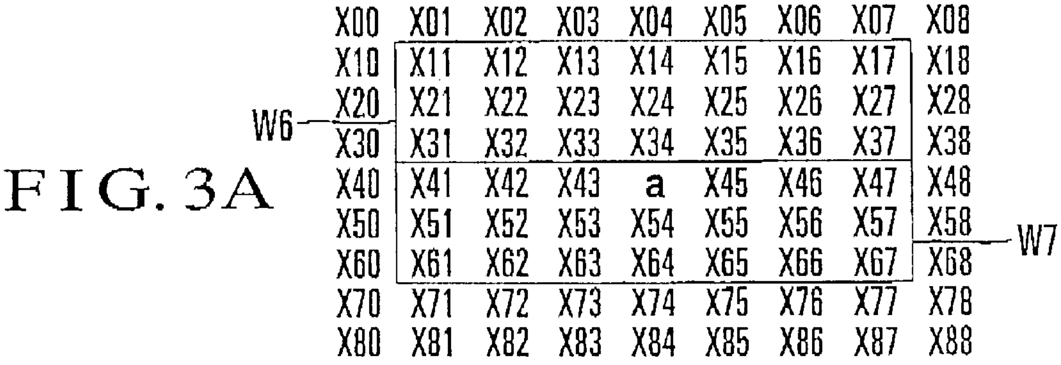
FIG. 3B
| | | | | | | |
|---|---|---|---|---|---|---|
| 1 | 2 | 3 | 3 | 3 | 2 | 1 |
| 1 | 2 | 3 | 3 | 3 | 2 | 1 |
| 1 | 2 | 3 | 3 | 3 | 2 | 1 |
| -1 | -2 | -3 | • -3 | -3 | -2 | -1 |
| -1 | -2 | -3 | -3 | -3 | -2 | -1 |
| -1 | -2 | -3 | -3 | -3 | -2 | -1 |
/45
FIG. 3C
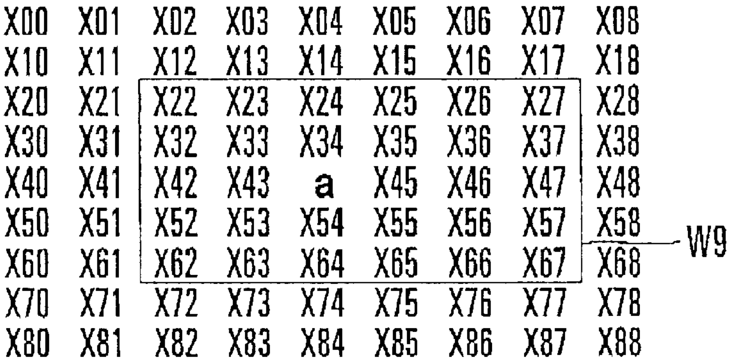

FIG. 4A
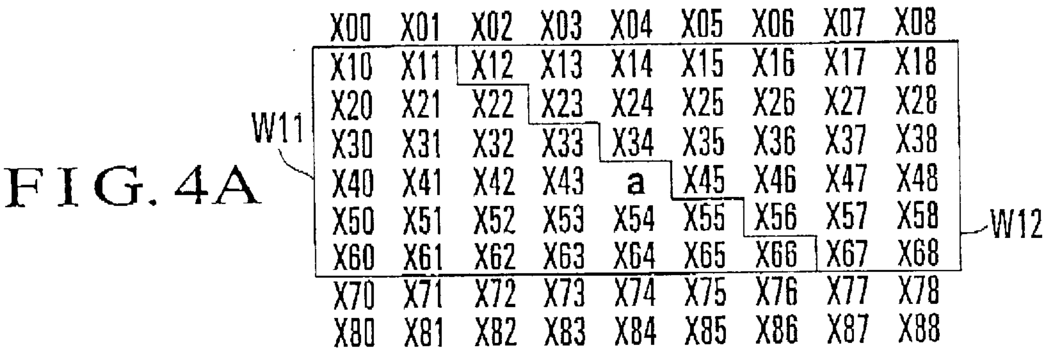
FIG. 4B
| | | | | | | | | |
|---|---|---|---|---|---|---|---|---|
| 0 | 0 | 0 | 0 | 0 | 0 | 0 | 0 | 0 |
| 0 | 2 | 2 | -2 | -2 | -2 | -1 | 0 | 0 |
| 0 | 3 | 3 | 3 | -3 | -3 | -3 | -1 | 0 |
| 0 | 1 | 3 | 3 | • 3 | -3 | -3 | -3 | -1 |
| 0 | 0 | 1 | 3 | 3 | 3 | -3 | -3 | -3 |
| 0 | 0 | 0 | 1 | 2 | 2 | 2 | -2 | -2 |
40
FIG. 4C
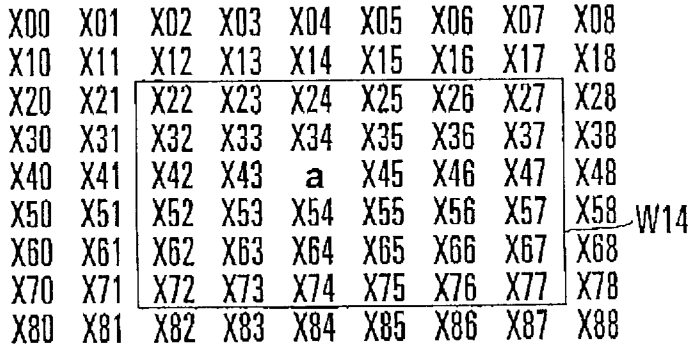

FIG. 5A
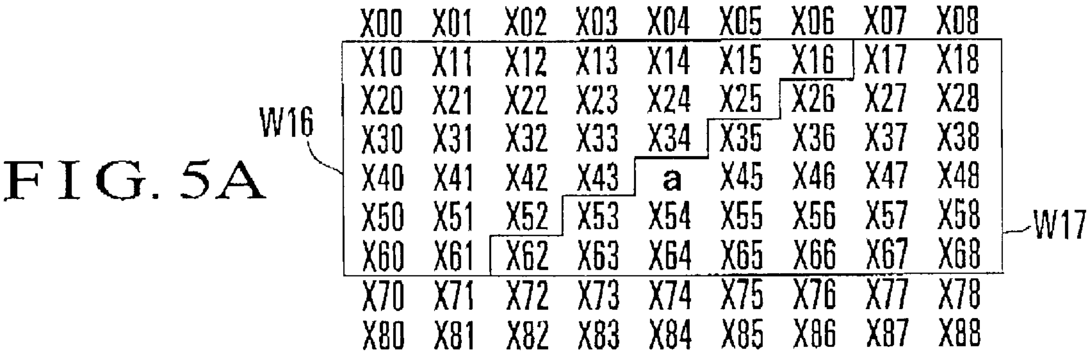
FIG. 5B
| | | | | | | | | |
|---|---|---|---|---|---|---|---|---|
| 0 | 0 | 0 | 0 | 0 | 0 | 0 | 0 | 0 |
| 0 | 0 | 1 | 2 | 2 | 2 | -2 | -2 | 0 |
| 0 | 1 | 3 | 3 | 3 | -3 | -3 | -3 | 0 |
| 1 | 3 | 3 | 3 | • -3 | -3 | -3 | -1 | 0 |
| 3 | 3 | 3 | -3 | -3 | -3 | -1 | 0 | 0 |
| 2 | 2 | -2 | -2 | -2 | -1 | 0 | 0 | 0 |
/40
FIG. 5C
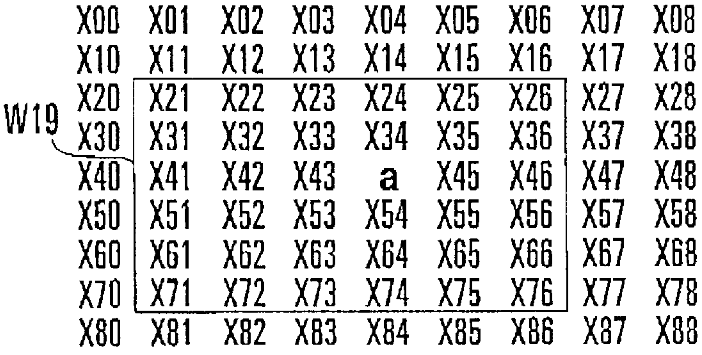

LINE SEGMENT DETECTOR

BACKGROUND OF THE INVENTION

The present invention relates to a line segment detector which detects character and diagram line segments from input images or line segments of the contour portions of natural images.

It is important in the fields of coding, image processing, and the like to extract character and diagram line segments from input images or line segments of the contour portions of natural images. A conventional line segment detector for detecting line segments from input images is disclosed in Japanese Patent Laid-Open No. 8-237475 (reference 1).

The line segment detector disclosed in reference 1 includes a dot feature amount extraction function of extracting the feature amount of a dot area, in an M×N window containing a target pixel in an image, by logical operation and detecting whether the target pixel is a dot candidate pixel or not, a maximum signal level difference detection function of obtaining the difference between the maximum and minimum levels of an image signal in the window, an edge detection function of converting the image signal into a P-value and comparing the P-value signal with a predetermined signal pattern to detect whether the target pixel is an edge image or not, a ratio counting function of counting the ratio of pixels included in the uppermost level if the target pixel is at the uppermost level, and counting the ratio of pixels included in the lowermost level if the target pixel is at the lowermost level, and a change count counting function of counting the sum of the change count of level from the uppermost level to the lowermost level and the change count of level from the lowermost level to the uppermost level. This detector then identifies dots, characters, and photographs in accordance with these count results.

According to the conventional line segment detector, however, when a color still image made up of dots is processed, a dot is erroneously detected as a line segment. This is because, since the conventional line segment detection scheme detects a line segment by differentiation, the differentiation responds to point images constituting a dot image to result in a detection error. A method of detecting line segments by using the Hough transform has also been proposed. In this method, however, since positions where the differential values are large are traced, desired performance cannot be obtained if positions where the differential values are large occur randomly as in a dot image.

To solve the above problem of error detection, a method of performing differentiation after a dot period is eliminated through a low-pass filter is available. In this method, although the differential values at dots are reduced, the differential values at thin line segments are also reduced. For this reason, a threshold for separating dots from line segments cannot be selected, and thin line segments cannot be detected.

SUMMARY OF THE INVENTION

It is an object of the present invention to provide a line segment detector which can correctly detect line segments even in an image having both dots and line segments without responding to any dots.

In order to achieve the above object, according to the present invention, there is provided a line segment detector comprising first weighted average 1S means for calculating a weighted average of pixel values in a first detection window set in a first neighboring area of a target pixel in an input image, second weighted average means for calculating a weighted average of pixel values in a second detection window set in a second neighboring area point symmetrical with the first neighboring area with respect to the target pixel, differentiating means for calculating an absolute value of a difference between outputs from the first and second weighted average means, dot detecting means for calculating an average of absolute values of differential values between pixels in a direction of at least one of a vertical line, horizontal line, left-to-right downward slanting line, and left-to-right upward slanting line within a third detection window set in an area containing the target pixel, and comparing means for, if a subtraction result obtained by subtracting an output from the dot detecting means from an output from the differentiating means is larger than a predetermined threshold, determining that a portion near the target pixel is one of a vertical line image, horizontal line image, left-to-right downward slanting line image, and left-to-right upward slanting line image.

BRIEF DESCRIPTION OF THE DRAWINGS

FIGS. 2A to 2D are views for explaining vertical line detecting operation performed by the line segment detector in FIG. 1;

FIGS. 3A to 3C are views for explaining horizontal line detecting operation performed by the line segment detector in FIG. 1:

FIGS. 4A to 4C are views for explaining left-to-right downward slanting line detecting operation performed by the line segment detector in FIG. 1;

FIGS. 5A to 5C are views for explaining left-to-right upward slanting line detecting operation performed by the line segment detector in FIG. 1.

DESCRIPTION OF THE PREFERRED EMBODIMENTS

The present invention will be described in detail below with reference to the accompanying drawings.

Figure 1:
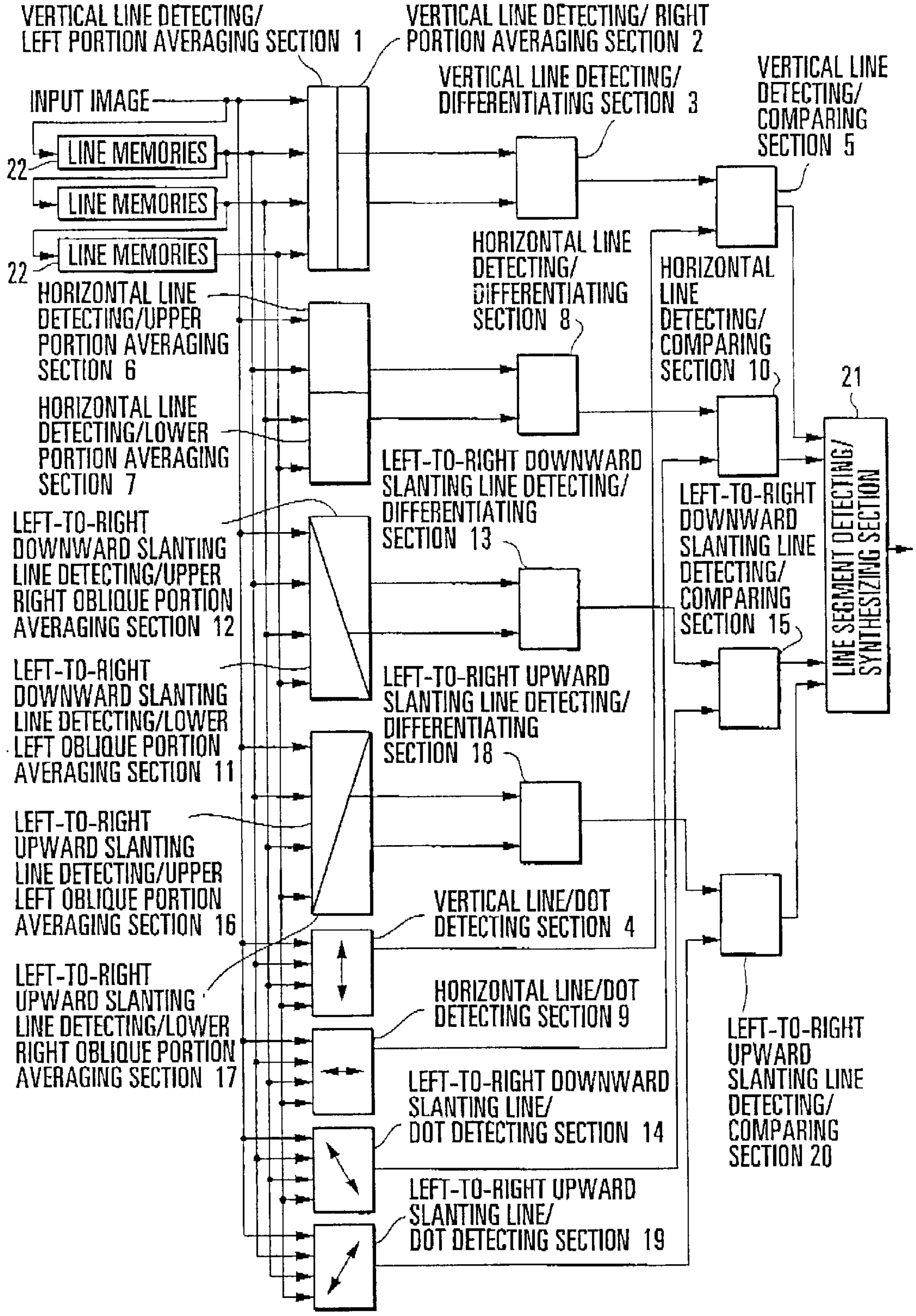
FIG. 1 is a block diagram showing a line segment detector according to the first embodiment of the present invention.

FIG. 1 shows the arrangement of a line segment detector according to the first embodiment of the present invention. Referring to FIG. 1, the line segment detector according to this embodiment includes a vertical line detecting/left portion averaging section 1 for setting a window near the left side of a target pixel and calculating the weighted average of the pixel values in the window, a vertical line detecting/right portion averaging section 2 for setting a window near the right side of a target pixel and calculating the weighted average of the pixel values in the window, a vertical line detecting/differentiating section 3 for calculating the absolute value of the difference between an output value from the vertical line detecting/left portion averaging section 1 and an output value from the vertical line detecting/right portion averaging section 2, a vertical line/dot detecting section 4 for setting a window near the target pixel and calculating the average of the absolute values of differential values between upper and lower pixels in the window, and a vertical line detecting/comparing section 5 for subtracting an output value from the vertical line/dot detecting section 4 from an output value from the vertical line detecting/differentiating section 3, comparing the subtraction result with a threshold, and determining, when the subtraction result is larger than the threshold, that the target pixel is a vertical line image.

The line segment detector further includes a horizontal line detecting/upper portion averaging section 6 for setting a window near the upper side of a target pixel and calculating the weighted average of the pixel values in the window, a horizontal line detecting/lower portion averaging section 7 for setting a window near the lower side of the target pixel and calculating the weighted average of the pixel values in the window, a horizontal line detecting/differentiating section 8 for calculating the absolute value of the difference between an output value from the horizontal line detecting/upper portion averaging section 6 and an output value from the horizontal line detecting/lower portion averaging section 7, a horizontal line/dot detecting section 9 for setting a window near the target pixel and calculating the average of the absolute values of differential values between left and right pixels in the window, and a horizontal line detecting/comparing section 10 for subtracting an output value from the horizontal line/dot detecting section 9 from an output value from the horizontal line detecting/differentiating section 8, comparing the subtraction result with a threshold, and determining, when the subtraction result is larger than the threshold, that the target pixel is a horizontal line image.

The line segment detector also includes a left-to-right downward slanting line detecting/lower left oblique portion averaging section 11 for setting a window near the lower left oblique side of a target pixel and calculating the weighted average of the pixel values in the window, a left-to-right downward slanting line detecting/upper right oblique portion averaging section 12 for setting a window near the upper right oblique side of the target pixel and calculating the weighted average of the pixel values in the window, a left-to-right downward slanting line detecting/differentiating section 13 for calculating the absolute value of the difference between an output value from the left-to-right downward slanting line detecting/upper right oblique portion averaging section and an output value from the left-to-right downward slanting line detecting/lower left oblique portion averaging section 11, a left-to-right downward slanting line/dot detecting section 14 for setting a window near the target pixel and calculating the average of the absolute values of differential values between the pixels in the lower right oblique direction in the window, and a left-to-right downward slanting line detecting/comparing section 15 for subtracting an output value from the left-to-right downward slanting line/dot detecting section 14 from an output value from the left-to-right downward slanting line detecting/differentiating section 13, comparing the subtraction result with a threshold, and determining, when the subtraction value is larger than the threshold, that the target pixel is a left-to-right downward slanting line image.

The line segment detector further includes a left-to-right upward slanting line detecting/upper left oblique portion averaging section 16 for setting a window near the upper left oblique side of a target pixel and calculating the weighted average of the pixel values in the window, a left-to-right upward slanting line detecting/lower right oblique portion averaging section 17 for setting a window near the lower right oblique side of the target pixel and calculating the weighted average of the pixel values in the window, a left-to-right upward slanting line detecting/differentiating section 18 for calculating absolute value of the difference between an output value from the left-to-right upward slanting line detecting/upper left oblique portion averaging section and an output value from the left-to-right upward slanting line detecting/lower right oblique portion averaging section 17, a left-to-right upward slanting line/dot detecting section 19 for setting a window near the target pixel and calculating the average of the absolute values of differential values between the pixels in the upper right oblique direction in the window, and a left-to-right upward slanting line detecting/comparing section 20 for subtracting an output value from the left-to-right upward slanting line/dot detecting section 19 from an output value from the left-to-right upward slanting line detecting/differentiating section 18, comparing the subtraction result with a threshold, and determining, when the subtraction result is larger than the threshold, that the target pixel is a left-to-right downward slanting line image.

In addition, the line segment detector includes a line segment detecting/synthesizing section for calculating the logical OR between an output value from the vertical line detecting/comparing section 5, an output value from the horizontal line detecting/comparing section 10, an output value from the left-to-right downward slanting line detecting/comparing section 15, and an output value from the left-to-right upward slanting line detecting/comparing section 20, and a plurality of line memories 22 for delaying an input image by one line.

The operation of the line segment detector having the above arrangement will be described next.

Vertical line detection will be described first with reference to FIGS. 2A to 2C. Assume that an input image like the one shown in FIG. 2A in input. In this case, since computations across lines must be performed for a plurality of lines, image data corresponding to the plurality of lines must be simultaneously input to the vertical line detecting/left portion averaging section 1, vertical line detecting/right portion averaging section 2, vertical line/dot detecting section 4, horizontal line detecting/upper portion averaging section 6, horizontal line detecting/lower portion averaging section 7, horizontal line/dot detecting section 9, left-to-right downward slanting line detecting/lower left oblique portion averaging section 11, left-to-right downward slanting line detecting/upper right oblique portion averaging section 12, left-to-right downward slanting line/dot detecting section 14, left-to-right upward slanting line detecting/upper left oblique portion averaging section 16, left-to-right upward slanting line detecting/lower right oblique portion averaging section 17, and left-to-right upward slanting line/dot detecting section 19.

The image data corresponding to the plurality of lines are therefore simultaneously input by using the plurality of line memories 22. Referring to FIG. 1, the number of line memories 22 is set to "3". If, however, the maximum number of lines required for computations is set to "7", the number of line memories 22 becomes "6" (=7−1). Referring to FIG. 2A, reference symbols X00 to X08, X10 to X18, X20 to X28, X30 to X38, X40 to X48, X50 to X58, X60 to X68, X70 to X78, and X80 to X88 denote pixel values.

The vertical line detecting/left portion averaging section 1 sets a rectangular window W1 constituted by n1 pixels in the main scanning direction (the main scanning direction is the horizontal direction; n1=3)× m1 pixels in the sub-scanning direction (the sub-scanning direction is the vertical direction; m1=7) on the left side of a target pixel a, and calculates the weighted average of the pixel values in the window W1. More specifically, if the window W1 is set as shown in FIG. 2B, an output value from the vertical line detecting/left portion averaging section 1 is obtained according to equation (1):

$$\text{output value from vertical line detecting/left portion averaging section}=((X11+X12+X13)\times\alpha+(X21+X22+X23)\times\beta+(X31+X32+X33)\times\gamma+(X41+X42+X43)\times\gamma+(X51+X52+X53)\times\gamma+(X61+X62+X63)\times\beta+(X71+X72+X73)\times\alpha)/\epsilon \quad (1)$$

where α, β, and γ are weights by which the pixel values X11 to X13, X21 to X23, X31 to X33, X41 to X43, X51 to X53, X61 to X63. and X71 to X73 are multiplied. The weights α, β, and γ are set to be larger as the corresponding pixels are located nearer to the target pixel a. In this embodiment, α=1, β, and γ=3.

If all the weights α, β, and γ are "1", ε becomes equal to the number of pixels, 3×7=21, in the window W1. In this embodiment, however, since α=1, β=2, and γ=3, ε is α×(6, the number of pixels to be multiplied by the weight α)+β×(6, the number of pixels to be multiplied by the weight β)+γ×(9, the number of pixels to be multiplied by γ).

The vertical line detecting/right portion averaging section 2 sets a rectangular window W2 constituted by n1 pixels in the main scanning direction×m1 pixels in the sub-scanning direction on the right side of the target pixel a, and calculates the weighted average of the pixel values in the window W2. More specifically, if the window W2 is set as shown in FIG. 2B, an output value from the vertical line detecting/right portion averaging section 2 is obtained according to equation (2):

$$\text{output value from vertical line detecting/right portion averaging section }((X14+X15+X16)\times\alpha+(X24+X25+X26)\times\beta+(X34+X35+X36)\times\gamma+(a+X45+X46)\times\gamma+(X54+X55+X56)\times\gamma+(X64+X65+X66)\times\beta+(X74+X75+X76)\times\alpha)/\epsilon \quad (2)$$

Note that the windows W1 and W2 are set such that there are no overlapping pixels and one of the windows contains the target pixel a. The windows W1 and W2 may be spaced apart from each other. In this case, however, the line memories used need to be increased in size. For this reason, as shown in FIG. 2B, the windows W1 and W2 are preferably set adjacent to each other.

The vertical line detecting/differentiating section 3 calculates the absolute value of the difference between an output value from the vertical line detecting/left portion averaging section 1 and an output value from the vertical line detecting/right portion averaging section 2. More specifically, an output value from the vertical line detecting/differentiating section 3 is obtained according to equation (3):

$$\text{output value from vertical line detecting/differentiating section}=|\text{output value from vertical line detecting/left portion averaging section}-\text{output value from vertical line detecting/right portion averaging section}| \quad (3)$$

FIG. 2C schematically shows the computation performed by the vertical line detecting/differentiating section 3. Referring to FIG. 2C, the bullet indicates the position of the target pixel a.

The vertical line/dot detecting section 4 sets a rectangular window W4 containing the target pixel a, which is constituted by k1 (k1=5 in this embodiment) pixels in the main scanning direction×j1 (j1=6 in this embodiment) pixels in the sub-scanning direction, and calculates the average of the absolute values of differential values between the upper and lower pixels in the window W4. More specifically, if the window W4 is set as shown in FIG. 2D, an output value from the vertical line/dot detecting section 4 is obtained according to equation (4):

$$\text{output value from vertical line/dot detecting section }(|X22-X32|+|X32-X42|+|X42-X52|+|X52-X62|+|X62-X72|+|X23-X33|+|X33-X43|+|X43-X53|+|X53-X63|+|X63-X73|+|X24-X34|+|X34-a|+|a-X54|+|X54-X64|+|X64-X74|+|X25-X35|+|X35-X45|+|X45-X55|+|X55-X65|+|X65-X75|+|X26-X36|+X36-X46|+|X46-X56|+|X56-X66|+|X66-X76|)/25 \quad (4)$$

An output value from the vertical line/dot detecting section 4 is not obtained by calculating a difference upon calculation of averages, and hence indicates a relatively large value when the image in the window W4 containing the target pixel v is a dot image. In contrast to this, if the image in the window W4 containing the target pixel a is a vertical line image, since differentiation is performed between the pixels in the vertical direction (parallel to a vertical line), this output value indicates a relatively small value, The vertical line detecting/comparing section subtracts an output value from the vertical line/dot detecting section 4 from an output value from the vertical line detecting/differentiating section 3, and compares the subtraction result with a predetermined threshold. If the subtraction result is larger than the threshold, the vertical line detecting/comparing section determines that the target pixel v or its neighboring pixel is a vertical image, and set the output value to "1". If the subtraction result is equal to or smaller than the threshold, the vertical line detecting/comparing section 5 determines that the pixel is not a vertical line image, and sets the output value to "0".

Horizontal line detection will be described next with reference to FIGS. 3A to 3C. The horizontal line detecting/upper portion averaging section 6 sets a rectangular window W6 constituted by n2 (n2=7 in this embodiment) pixels in the main scanning direction×m2 (m2=3 in this embodiment) pixels in the sub-scanning direction on the upper side of the target pixel a of the input image shown in FIG. 2A, and calculates the weighted average of the pixel values in the window W6. More specifically, if the window W6 is set as shown in FIG. 3A, an output value from the horizontal line detecting/upper portion averaging section 6 is obtained according to equation (5):

$$\text{output value from horizontal line detecting/upper portion averaging section}=((X11+X21^{+X}31)\times\alpha+(X12+X22+X32)\times\beta+(X13+X23+X33)\times\gamma+(X14+X24+X34)\times\gamma+(X15+X25+X35)\times\gamma$$

$$+(X16+X26+X36)\times\beta+(X17+X27+X37)\times\alpha)/\zeta \quad (5)$$

If all the weights α, β, and γ are "1", ζ becomes equal to the number of pixels, 3×7=21, in the window W6. In this embodiment, however, since α=1, β=2, and γ=3, ζ is α×(6, the number of pixels to be multiplied by the weight α)+β×(6, the number of pixels to be multiplied by the weight β)+γ×(9, the number of pixels to be multiplied by γ)=45.

The horizontal line detecting/lower portion averaging section 7 sets a rectangular window W7 constituted by n2 pixels in the main scanning direction>m2 pixels in the sub-scanning direction on the lower side of the target pixel a in the input image, and calculates the weighted average of the pixel values in the window W7. More specifically, if the window W7 is set as shown in FIG. 3A, an output value from the horizontal line detecting/lower portion averaging section 7 is obtained according to equation (6):

$$\text{output value from horizontal line detecting/lower portion averaging section}=((X41+X51+X61)\times\alpha+(X42+X52+X62)\times\beta+(X43+X53+X63)\times\gamma+(a+X54+X64)\times\gamma+(X45+X55+X65)\times\gamma+(X46+X56+X66)\times\beta+(X47+X57+X67)\times\alpha)/\zeta \quad (6)$$

Note that the windows W6 and W7 are set such that there are no overlapping pixels and one of the windows contains the target pixel A. The windows W6 and W7 may be spaced apart from each other. In this case, however, the line memories used need to be increased in size. For this reason, as shown in FIG. 3A, the windows W6 and W7 are preferably set adjacent to each other.

The horizontal line detecting/differentiating section 8 calculates the absolute value of the difference between an output value from the horizontal line detecting/upper portion averaging section 6 and an output value from the horizontal line detecting/lower portion averaging section 7. More specifically, an output value from the horizontal line detecting/differentiating section 8 is obtained according to equation (7):

output value from horizontal line detecting/differentiating section= |output value from horizontal line detecting/upper portion averaging section−output value from horizontal line detecting/lower portion averaging section| (7)

FIG. 3B schematically shows the computation performed by the horizontal line detecting/differentiating section 8. Referring to FIG. 3B, the bullet indicates the position of the target pixel a.

The horizontal line/dot detecting section 9 sets a rectangular window W9 containing the target pixel a, which is constituted by k2 (k2=6 in this embodiment) pixels in the main scanning direction×j2 (j1=5 in this embodiment) pixels in the sub-scanning direction, and calculates the average of the absolute values of differential values between the left and right pixels in the window W9. More specifically, if the window W9 is set as shown in FIG. 3C, an output value from the horizontal line/dot detecting section 9 is obtained according to equation (8):

$$\text{output value from horizontal line/dot detecting section}=(|X22-X23|+|X23-X24|+|X24-X25|+|X25-X26|+|X26-X27|+|X32-X33|+|X33-X34|+|X34-X35|+|X35-X36|+|X36-X37|+|X42-X43|+|X43-a|+|a-X45|+|X45-X46|+|X46-X47|+|X52-X53|+|X53-X54|+|X54-X55|+|X55-X56|+|X56-X57|+|X62-X63|+|X63-X64|+|X64-X65|+|X65-X66|+|X66-X67|)/25 \quad (8)$$

The horizontal line detecting/comparing section 10 subtracts an output value from the horizontal line/dot detecting section 9 from an output value from the horizontal line detecting/differentiating section 8, and compares the subtraction result with a predetermined threshold. If the subtraction result is larger than the threshold, the horizontal line detecting/comparing section 10 determines that the target pixel a or its neighboring pixel is a horizontal image, and set the output value to "1"(. If the subtraction result is equal to or smaller than the threshold, the horizontal line detecting/comparing section 10 determines that the pixel is not a horizontal line image, and sets the output value to "0".

Left-to-right downward slanting line detection will be described next with reference to FIGS. 4A to 4C. The left-to-right downward slanting line detecting/lower left oblique portion averaging section 11 sets a trapezoidal (or parallelogram) window W11 with the upper base corresponding to n3 (n3=2 in this embodiment) pixels in the main scanning direction, the lower base corresponding to m3 (m3=7 in this embodiment) pixels in the main scanning direction, and the height corresponding to h3 (h3=6 in this embodiment) in the sub-scanning direction on the lower left oblique side of the target pixel a in the input image, and calculates the weighted average of the pixel values in the window W11. More specifically, if the window W11 is set as shown in FIG. 4A, an output value from the left-to-right downward slanting line detecting/lower left oblique portion averaging section 11 is obtained according to equation (9):

$$\text{output value from left-to-right downward slanting line detecting/lower left oblique portion averaging section}=((X10+X11)\times\delta+X20\times\delta+(X21+X22)\times\beta+X30\times\delta+(X31+X32+X33)\times\delta+X40\times\delta+X41\times\alpha+(X42+X43+a)\times\gamma+(X50+X51)\times\delta+X52\times\alpha+(X53+X54+X55)\times\gamma+(X60+X61+X62)\times\delta+X63\times\alpha+(X64+X65+X66)\times\beta)/\eta \quad (9)$$

where δ is a weight like δ, β, and γ. In this embodiment, δ=0. If all the weights α, β, γ, and δ are "1", η becomes equal to the number of pixels. 27 in the window W11. In this embodiment, however, since α=1, β=2, γ=3, and δ=0, η is α×(3, the number of pixels to be multiplied by the weight α)+β×(5, the number of pixels to be multiplied by the weight β)+γ×(9, the number of pixels to be multiplied by γ)+δ×(10, the number of pixels to be multiplied by δ)=40.

The left-to-right downward slanting line detecting/upper right oblique portion averaging section sets a trapezoidal (or parallelogram) window W12 with the upper base corresponding to m3 pixels in the main scanning direction, the lower base corresponding to n3 pixels in the main scanning direction, and the height corresponding to h3 pixels in the sub-scanning direction on the upper right oblique side of the target pixel a in the input image, and calculates the weighted average of the pixel values in the window W12. More specifically, if the window W12 is set as shown in FIG. 4A, an output value from the left-to-right downward slanting line detecting/upper right oblique portion averaging section is obtained according to equation (10):

$$\text{output value from left-to-right downward slanting line detecting/upper right oblique portion averaging section}=((X68+X67)\times\beta+(X58+X57+X56)\times\gamma+X48\times\alpha+(X47+X46+X45)\times\gamma+X38\times\delta+X37\times\alpha+(X36+X35+X34)\times\gamma+(X28+X27)\times\delta+X26\times\alpha+(X23+X24+X23)\times\beta+(X18+X17+X16+X15+X14+X13+X12)\times\delta)/\eta \quad (10)$$

Note that the windows W11 and W12 are set such that there are no overlapping pixels and one of the windows contains the target pixel a. The windows W11 and W12 may be spaced apart from each other. In this case, however, the line memories used need to be increased in size. For this reason, as shown in FIG. 2B, the windows W11 and W12 are preferably set adjacent to each other.

The left-to-right downward slanting line detecting/differentiating section 13 calculates the absolute value of the difference between an output value from the left-to-right downward slanting line detecting/lower left oblique portion averaging section and an output value from the left-to-right downward slanting line detecting/upper right oblique portion averaging section 12. More specifically, an output value from the left-to-right downward slanting line detecting/differentiating section 13 is obtained according to equation (11):

output value from left-to-right downward slanting line detecting/differentiating section=|output value from left-to-right downward slanting line detecting/lower left oblique portion averaging section−output value from left-to-right downward slanting line detecting/upper right oblique portion averaging section| (11)

FIG. 4B schematically shows the computation performed by the left-to-right downward slanting line detecting/differentiating section 13.

The left-to-right downward slanting line/dot detecting section 14 sets a rectangular window W14 containing the target pixel a, which is constituted by k3 (k3=6 in this embodiment) pixels in the main scanning direction×j3 (j3=6 in this embodiment) pixels in the sub-scanning direction, and calculates the average of the absolute values of differential values between the pixels in the lower right oblique direction in the window W14 More specifically, if the window W14 is set as shown in FIG. 4C, an output value from the left-to-right downward slanting line/dot detecting section 14 is obtained according to equation (12):

$$\text{output value from left-to-right downward slanting line/dot detecting section}=(|X22-X33|+|X23-X34|+|X24-X35|+|X25-X36|+|X26-X37|+|X32-X43|+|X33-a|+|X34-X45|+|X35-X46|+|X36-X47|+|X42-X53|+|X43-54|+|a-X55|+|X45-X56|+|X46-X57|+|X52-X63|+|X53-X64|+|X54-X65|+|X55-X66|+|X56-X67|+|X62-X73|+|X63-X74|+|X64-X75|+|X65-X76|+|X66-X77|)/25 \quad (12)$$

The left-to-right downward slanting line detecting/comparing section 15 subtracts an output value from the left-to-right downward slanting line/dot detecting section 14 from an output value from the left-to-right downward slanting line detecting/differentiating section 13, and compares the subtraction result with a predetermined threshold. If the subtraction result is larger than the threshold, the left-to-right downward slanting line detecting/comparing section 15 determines that the target pixel a or its neighboring pixel is a left-to-right downward slanting line image, and set the output value to "1". If the subtraction result is equal to or smaller than the threshold, the left-to-right downward slanting line detecting/comparing section 15 determines that the pixel is not a left-to-right downward slanting line image, and sets the output value to "0".

Left-to-right upward slanting line detection will be described next with reference to FIGS. 5A to 5C. The left-to-right upward slanting line detecting/upper left oblique portion averaging section 16 sets a trapezoidal (or parallelogram) window W16 with the upper base corresponding to n4 (n4=7 in this embodiment) pixels in the main scanning direction, the lower base corresponding to m4 (m4=2 in this embodiment) pixels in the main scanning direction, and the height corresponding to h4 (h4=6 in this embodiment) pixels in the substantially on the upper left oblique side of the target pixel a in the input image, and calculates the weighted average of the pixel values in the window W16. More specifically, if the window W16 is set as shown in FIG. 5A, an output value from the left-to-right upward slanting line detecting/upper left oblique portion averaging section 16 is obtained according to equation (13):

$$\text{output value from left-to-right upward slanting, line detecting/upper left oblique portion averaging section}=((X60+X61)\times\beta+(X50+X51\ X52)\times\gamma+X40\times a+(X41+X42+X43)\times\delta+X30\times\delta+X31\times\alpha+(X32+X33+X34)\times\gamma+(X20+X21)\times\delta+X22\times\alpha+(X23+X24+X25)\times\beta+(X10+X11+X12+X13+X14+X15+X16)\times\delta)/\theta \quad (13)$$

If all the weights α, β, γ, and δare "1", θ becomes equal to the number of pixels, 27 in the window W16. In this embodiment, however, since α=1, β=2, γ=3, and δ=0. θ is α×(3, the number of pixels to be multiplied by the weight α)+β×(5, the number of pixels to be multiplied by the weight β)+γ×(9, the number of pixels to be multiplied by γ)+δ×(10, the number of pixels to be multiplied by δ)=40.

The left-to-right upward slanting line detecting/lower right oblique portion averaging section sets a trapezoidal (or parallelogram) window W17 with the upper base corresponding to m4 pixels in the main scanning direction, the lower base corresponding to n4 pixels in the main scanning direction, and the height corresponding to h4 pixels in the sub-scanning direction on the lower right oblique side of the target pixel a in the input image, and calculates the weighted average of the pixel values in the window W17. More specifically, if the window W17 is set as shown in FIG. 5A, an output value from the left-to-right upward slanting line detecting/lower right oblique portion averaging section is obtained according to equation (14):

$$\text{output value from left-to-right upward slanting line detecting/lower right oblique portion averaging section}=((X18+X17)\times\delta+X28+\delta+(X27+X26)\times\beta+X38\times\delta+(X37+X36+X35)\times\gamma+X48\times\delta+X47\times\alpha+(X46+X45+a)\times\gamma+(X58+X57)\times\delta+X56\times\alpha+(X55+X54+X53)\times\gamma+(X68+X67+X66)\times\delta+X65\times\alpha+(X64+X63+X62)\times\beta)/\theta \quad (14)$$

Note that the windows W16 and W17 are set such that there are no overlapping pixels and one of the windows contains the target pixel a. The windows W16 and W17 may be spaced apart from each other. In this case, however, the line memories used need to be increased in size. For this reason, an shown in FIG. 21, the windows W16 and W17 are preferably set adjacent to each other.

The left-to-right upward slanting line detecting/differentiating section 18 calculates the absolute value of the difference between an output value from the left-to-right upward slanting line detecting/upper left oblique portion averaging section 16 and an output value from the left-to-right upward slanting line detecting/lower right oblique portion averaging section 17. More specifically, an output value from the left-to-right upward slanting line detecting/differentiating section 18 is obtained according to equation (15):

$$\text{output value from left-to-right upward slanting line detecting/differentiating section}=|\text{output value from left-to-right upward slanting line detecting/upper left oblique portion averaging section}-\text{output value from left-to-right upward slanting line detecting/lower right oblique portion averaging section}| \quad (15)$$

FIG. 5B schematically shows the computation performed by the left-to-right upward slanting line detecting/differentiating section 18.

The left-to-right upward slanting line/dot detecting section 19 sets a rectangular window W19 containing the target pixel a, which is constituted by k4 (k4=6 in this embodiment) pixels in the main scanning direction×J4(j4=6 in this embodiment) pixels in the sub-scanning direction, and calculates the average of the absolute values of differential values between the pixels in the upper right oblique direction in the window W19. More specifically, if the window W19 is set as shown in FIG. 5C, an output value from the left-to-right upward slanting line/dot detecting section is obtained according to equation (16):

$$\text{output value from left-to-right upward slanting line/dot detecting section}=(|X22-X31|+|X23-X32|+|X24-X33|+|X25-X34|+|X26-X35|+|X32-X41|+|X33-X42|+|X34-X43|+|X35-a|+|X36-X45|+|X42-51|+|X43-X52|+|a-X53|+|X49-X54|+|X46-X55|+|X52-X61|+|X53\ X62|+|X54-X63|+|X55-X64|+|X56-X65|+|X62\ X71|+|X63-X72|+|X64-X73|+|X65-X74|+|X66-X75|)/25 \quad (16)$$

The left-to-right upward slanting line detecting/comparing section 20 subtracts an output value from the left-to-right upward slanting line/dot detecting section 19 from an output value from the left-to-right upward slanting line detecting/differentiating section 18, and compares the subtraction result with a predetermined threshold. If the subtraction result is larger than the threshold, the left-to-right upward slanting line detecting/comparing section 20 determines that the target pixel a or its neighboring pixel is a left-to-right upward slanting line image, and set the output value to "1". If the subtraction result is equal to or smaller than the threshold, the left-to-right upward slanting line detecting/comparing section 20 determines that the pixel is not a left-to-right upward slanting line image, and sets the output value to "0".

If a line image is detected by at least one of the vertical line detecting/comparing section 5, horizontal line detecting/comparing section 10, left-to-right downward slanting line detecting/comparing section 15, and left-to-right upward slanting line detecting/comparing section 20, the line segment detecting/synthesizing section 21 determines that the target pixel a or its neighboring pixel is a line segment image. If no line image is detected by any of the vertical line detecting/comparing section 5, horizontal line detecting/comparing section 10, left-to-right downward slanting line detecting/comparing section 15, and left-to-right upward slanting line detecting/comparing section 20, the line segment detecting/synthesizing section 21 determines that the target pixel a or its neighboring pixel is a surface image.

More specifically, the line segment detecting/synthesizing section 21 calculates the logical OR between output values from the comparing sections 5, 10, 15, and 20. If at least one of these output values is "1", the line segment detecting/synthesizing section outputs an output value "1" indicating a line segment image. If all the output values from the comparing sections 5, 10, 15, and 20 are "0", the line segment detecting/synthesizing section 21 outputs an output value "0" indicating a surface image.

The principle of the above embodiment will be described next. As in the conventional method, in this embodiment, low-pass filter processing is performed near the target pixel in an input image by calculating the weighted averages of the pixel values in the first windows W1, W6, W11, and W16. Likewise, low-pass filter processing is performed by calculating the weighted averages of the pixel values in the second windows W2, W7, W12, and W17 which are symmetrical with the first windows W1, W6, W11, and W16 with respect to the target pixel a. The differentiating sections 3, 8, 13, and 18 then obtain the absolute values of the differences (differential values) between the weighted averages in the first windows and the weighted averages in the second windows.

According to differential values after such low-pass filter processing, there are no differences between the values generated by dots and the values generated by line segments. In this embodiment, therefore, in order to solve the conventional problem that small line segments cannot be detected by differential values after low-pass filter processing, line segments in a dot image can be extracted by using a feature difference between line segments and dots. The feature difference between line segments and dots is as follows. When inter-pixel differentiation is performed near a target pixel in an arbitrary direction, the differential values generated by dots exhibit the same value in the arbitrary direction upon averaging. In contrast to this, in the case of a line segment, the value obtained by inter-pixel differentiation in a direction parallel to the line segment becomes small, whereas the value obtained in inter-pixel differentiation in a direction perpendicular to the line segment become large.

The dot detecting sections 4, 9, 14, and 19 obtain the averages of the absolute values of inter-pixel differential values before low-pass filter processing in a direction parallel to a line segment to be detected which is located near a target pixel by using this feature difference. If the target pixel is a dot, the values obtained by dot detecting sections 4, 9, 14, and 19 are large. If the target pixel is a line segment, these values become small because differentiation is performed in a direction parallel to the line segment. The output values from the dot detecting sections 4, 9, 14, and 19 are subtracted from the differential values after low-pass filter processing which are obtained by the differentiating sections 3, 8, 13, and 18. In this case, the subtraction results become small if the target pixel is a dot, and become large if the target pixel is a line segment because the differential values after low-pass filter processing are left unchanged. This makes it possible to separate dots from line segments with a threshold.

Note that the line segment detecting/synthesizing section 21 calculates the logical OR between output values from the comparing sections 5, 10, 15, and 20. However, the line segment detecting/synthesizing section 21 may calculate the logical OR between output values from the comparing sections 5 and 10, i.e., the result obtained by vertical line detection and the result obtained by horizontal line detection.

Figure 6A:
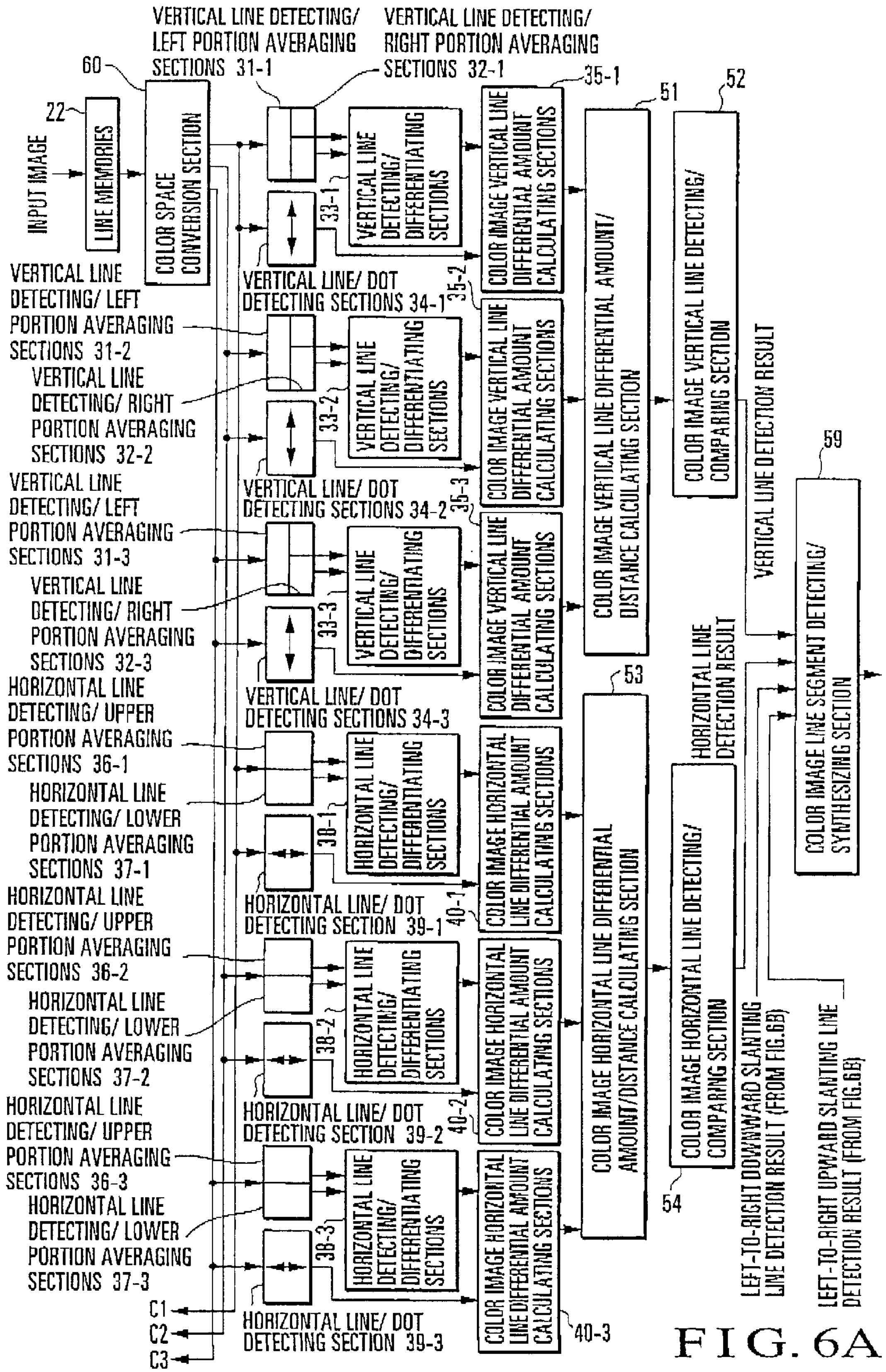
FIGS. 6A and 6B are block diagrams showing a line segment detector according to the second embodiment of the present invention.
Figure 6B:
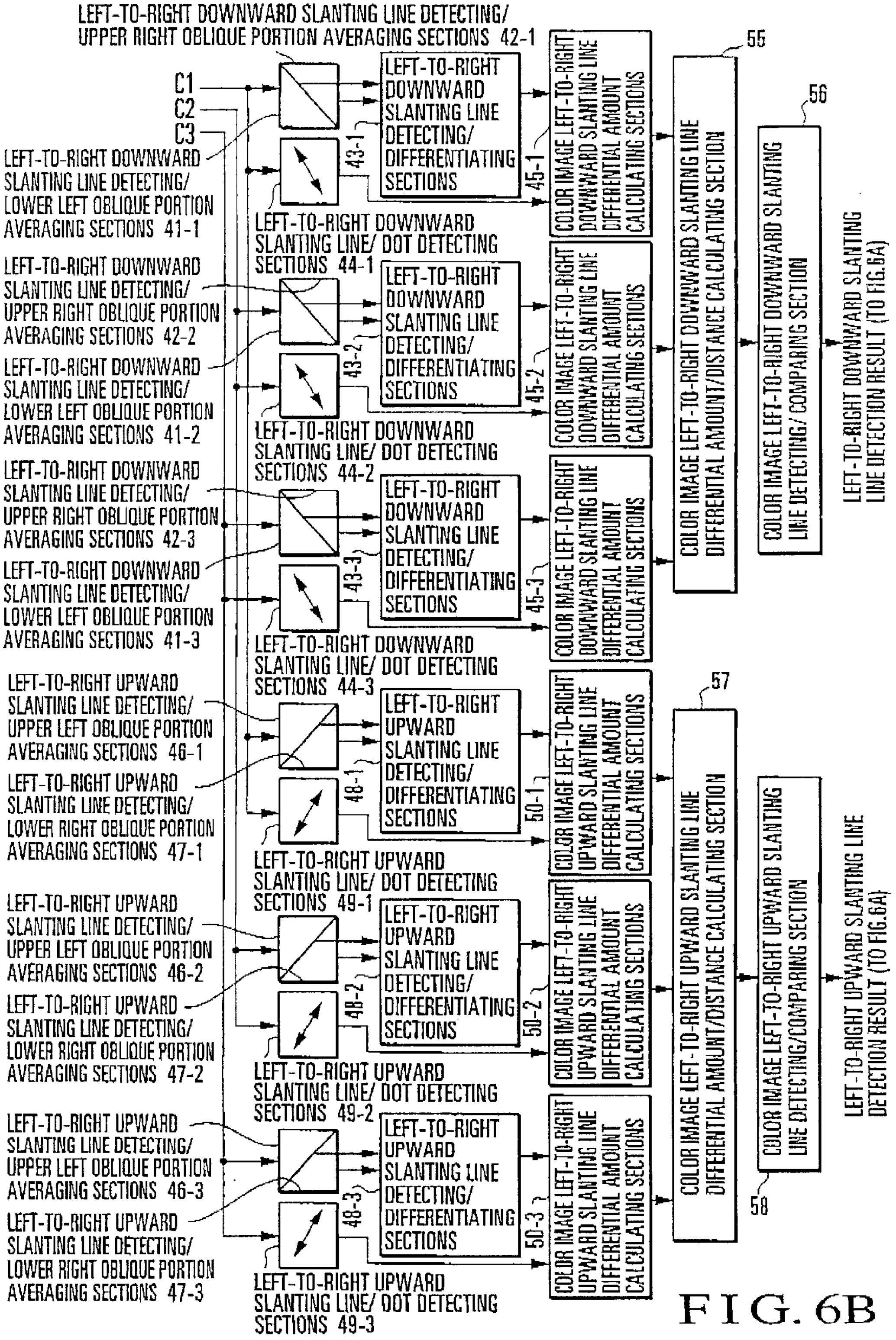

Although the first embodiment has exemplified the processing for monochrome images, the present invention can be applied to color images as well. FIGS. 6A and 6B show the arrangement of a line segment detector according to the second embodiment of the present invention. As in the first embodiment, in this embodiment, a plurality of line memories 22 are used to concurrently output image data corresponding to a plurality of lines in an input color image to a color space conversion section 60. For the sake of descriptive simplicity, FIG. 6A shows only one line memory.

The color space conversion section 60 performs color space conversion with respect to color image data corresponding to a plurality of lines which are output from the line memories 22 to decompose the data corresponding to each line into color components C1, C2, and C3, and outputs them. As the color components C1, C2, and C3, Lab components, YsCrCb components, and the like are defined by the Commission Internationale de l'Eclairage (CIE).

Vertical line detection will be described next with reference to FIG. 6A. Vertical line detecting/left portion averaging sections 31-1. 31-2, and 31-3 are provided in correspondence with the color components C1, C2, and C3 of the input image, and execute the same processing as that executed by the vertical line detecting/left portion averaging section 1 (FIG. 1) with respect to the corresponding color components. For example, the vertical line detecting/left portion averaging section 31-1 sets a window W1 on the left side of a target pixel a in the color component C1 of the input image, and calculates the weighted average of the pixel values in the window W1, Vertical line detecting/right portion averaging sections 32-1, 32-2, and 32-3 are provided in correspondence with the color components C1, C2, and C3 of the input image, and execute the same processing as that executed by the vertical line detecting/right portion averaging section 2 (FIG. 1) with respect to the corresponding color components. For example, the vertical line detecting/right portion averaging section 32-1 sets a window W2 on the right side of the target pixel a in the color component C1 of the input image, and calculates the weighted average of the pixel values in the window W2.

Vertical line detecting/differentiating sections 33-1, 33-2, and 33-3 are provided in correspondence with the color components C1, C2, and C3 of the input image, and execute the same processing as that executed by the vertical line detecting/differentiating section 3 (FIG. 1) with respect to the corresponding color components. For example, the vertical line detecting/differentiating section 33-1 calculates the absolute value of the difference between an output value from the vertical line detecting/left portion averaging section 33-1 and an output value from the vertical line detecting/right portion averaging section 32-1.

Vertical line/dot detecting sections 34-1, 34-2, and 34-3 are provided in correspondence with the color components C1, C2, and C3 of the input image, and execute the same processing as that executed by the vertical line/dot detecting section 4 (FIG. 1) with respect to the corresponding color components. For example, the vertical line/dot detecting section 34-1 sets a window W4 containing the target pixel a in the color component C1 of the input image, and calculates the average of the absolute values of differential values between upper and lower pixels in the window W4.

Color image vertical line differential amount calculating sections 35-1, 35-2, and 35-3 are provided in correspondence with the color components C1, C2, and C3. The color image vertical line differential amount calculating section 35-1 subtracts an output value from the vertical line/dot detecting section 34-1 from an output value from the vertical line detecting/differentiating section 33-1. The color image vertical line differential amount calculating section 35-2 subtracts an output value from the vertical line/dot detecting section 34-2 from an output value from the vertical line detecting/differentiating section 33-2. The color image vertical line differential amount calculating sections 35-3 subtracts an output value from the vertical line/dot detecting section 34-3 from an output value from the vertical line detecting/differentiating section 33-3. The subtraction results obtained by the color image vertical line differential amount calculating sections 35-1, 35-2, and 35-3 are output to a color image vertical line differential amount/distance calculating section 51.

The color image vertical line differential amount/distance calculating section 51 calculates the distance between the windows W1 and W2 in a 3D color space, after the output values from the vertical line/dot detecting sections 34 are subtracted and corrected, on the basis of the respective output values from the color image vertical line differential amount calculating sections 35-1, 35-2, and 35-3. The distance calculated by the color image vertical line differential amount/distance calculating section 51 may be a Euclidean distance or another distance such as a Pascal distance.

The color image vertical line detecting/comparing section 52 compares an output value from the color image vertical line differential amount/distance calculating section 51 with a threshold. If the output value is larger than the threshold, the color image vertical line detecting/comparing section 52 determines that the target pixel e or Its neighboring pixel is a vertical line image, and sets the output value "1". If the output value is equal to or smaller than the threshold, the color image vertical line detecting/comparing section 52 determines that the pixel is not a vertical line image, and sets the output value to "0".

Horizontal line detection will be described next with reference to FIG. 6A. Horizontal line detecting/upper portion averaging sections 36-1, 36-2, and 36-3 are provided in correspondence with the color components C1, C2, and C3 of the input image, and execute the same processing as that executed by the horizontal line detecting/upper portion averaging section 6 (FIG. 1) with respect to the corresponding color components. For example, the horizontal line detecting/upper portion averaging section 36-1 sets a window W6 on the upper side of the target pixel a in the color component C1 of the input image, and calculates the weighted average of the pixel values in the window W6.

Horizontal line detecting/lower portion averaging sections 37-1, 37-2, and 37-3 are provided in correspondence with the color components C1, C2, and C3 of the input image, and execute the same processing as that executed by the horizontal line detecting/lower portion averaging section 7 (FIG. 1) with respect to the corresponding color components. For example, the horizontal line detecting/lower portion averaging section 37-1 sets a window W7 on the lower side of the target pixel A in the color component C1 of the input image, and calculates the weighted average of the pixel values in the window W7.

Horizontal line detecting/differentiating sections 38-1, 38-2, and 38-3 are provided in correspondence with the color components C1, C2, and C3 of the input image, and execute the same processing as that executed by the horizontal line detecting/differentiating section 8 (FIG. 1) with respect to the corresponding color components. For example, the horizontal line detecting/differentiating section 38-1 calculates the absolute value of the difference between an output value from the horizontal line detecting/upper portion averaging section 36-1 and an output value from the horizontal line detecting/lower portion averaging section 37-1.

Horizontal line/dot detecting sections 39-1, 39-2, and 39-3 are provided in correspondence with the color components C1, C2, and C3 of the input image, and execute the same processing as that executed by the horizontal line/dot detecting section 9 (FIG. 1) with respect to the corresponding color components. For example, the horizontal line/dot detecting section 39-1 sets a window W9 containing the target pixel a in the color component C1 of the input image, and calculates the average of the absolute values of differential values between left and right pixels in the window W9.

Color image horizontal line differential amount calculating sections 40-1, 40-2, and 40-3 are provided in correspondence with the color components C1, C2, and C3. The color image horizontal line differential amount calculating section 40-1 subtracts an output value from the horizontal line/dot detecting section 39-1 from an output value from the horizontal line detecting/differentiating section 38-1. The color image horizontal line differential amount calculating section 40-2 subtracts an output value from the horizontal line/dot detecting section 39-2 from an output value from the horizontal line detecting/differentiating section 38-2. The color image horizontal line differential amount calculating section 40-3 subtracts an output value from the horizontal line/dot detecting section 39-3 from an output value from the horizontal line detecting/differentiating section 38-3. The subtraction results obtained by the color image horizontal line differential amount calculating sections 40-1, 40-2, and 40-3 are output to a color image horizontal line differential amount/distance calculating section 53.

The color image horizontal line differential amount/distance calculating section 53 calculates the distance between the windows W6 and W7 in a 3D color space, after the output values from the horizontal line/dot detecting section 39 are subtracted and corrected on the basis of the respective output values from the color image horizontal line differential amount calculating sections 40-1, 40-2, and 40-3. The color image horizontal line detecting/comparing section 54 compares an output value from the color image horizontal line differential amount/distance calculating section 53 with a threshold. If the output value is larger than the threshold, the color image horizontal line detecting/comparing section 54 determines that the target pixel a or its neighboring pixel is a horizontal line image, and sets the output value "1". If the output value is equal to or smaller than the threshold, the color image horizontal line detecting/comparing section 54 determines that the pixel is not a horizontal line image, and sets the output value to "0".

Left-to-right downward slanting line detection will be described next with reference to FIG. 6B Left-to-right downward slanting line detecting/lower left oblique portion averaging sections 41-1, 40-2, and 41-3 are provided in correspondence with the color components C1, C2, and C3 of the input image, and execute the same processing as that executed by the left-to-right downward slanting line detecting/lower left oblique portion averaging section 11 (FIG. 1) with respect to the corresponding color components. For example, the left-to-right downward slanting line detecting/lower left oblique portion averaging section 41-1 sets a window W11 on the lower left oblique side of the target pixel a in the color component C1 of the input image, and calculates the weighted average of the pixel values in the window W11.

Left-to-right downward slanting line detecting/upper right oblique portion averaging sections 42-1, 42-2, and 42-3 are provided in correspondence with the color components C1, C2, and C3 of the input image, and execute the same processing as that executed by the left-to-right downward slanting line detecting/upper right oblique portion averaging section 12 (FIG. 1) with respect to the corresponding color components. For example, the left-to-right downward slanting line detecting/upper right oblique portion averaging section 42-1 sets a window W12 on the upper right oblique side of the target pixel a in the color component C1 of the input image, and calculates the weighted average of the pixel values in the window W12.

Left-to-right downward slanting line detecting/differentiating sections 43-1, 43-2, and 43-3 are provided in correspondence with the color components C1, C2, and C3 of the input image, and execute the same processing as that executed by the left-to-right downward slanting line detecting/differentiating section (FIG. 1) with respect to the corresponding color components. For example, the left-to-right downward slanting line detecting/differentiating section 43-1 calculates the absolute value of the difference between an output value from the left-to-right downward slanting line detecting/lower left oblique portion averaging section 41-1 and an output value from the left-to-right downward slanting line detecting/upper right oblique portion averaging section 42-1.

Left-to-right downward slanting line/dot detecting sections 44-1, 44-2, and 44-3 are provided in correspondence with the color components C1, C2, and C3 of the input image, and execute the same processing as that executed by the left-to-right downward slanting line/dot detecting section 14 (FIG. 1) with respect to the corresponding color components. For example, the left-to-right downward slanting line/dot detecting section 44-1 sets a window W14 containing the target pixel a in the color component C1 of the input image, and calculates the average of the absolute values of differential values between left and right pixels in the window W14.

Color image left-to-right downward slanting line differential amount calculating sections 45-1, 45-2, and 45-3 are provided in correspondence with the color components C1, C2, and C3. The color image left-to-right downward slanting line differential amount calculating section 45-1 subtracts an output value from the left-to-right downward slanting line/dot detecting section 44-1 from an output value from the left-to-right downward slanting line detecting/differentiating section 43-1. The color image left-to-right downward slanting line differential amount calculating section 45-2 subtracts an output value from the left-to-right downward slanting line/dot detecting section 44-2 from an output value from the left-to-right downward slanting line detecting/differentiating section 43-2. The color image left-to-right downward slanting line differential amount calculating section 45-3 subtracts an output value from the left-to-right downward slanting line/dot detecting section 44-3 from an output value from the left-to-right downward slanting line detecting/differentiating section 43-3. The outputs from the color image left-to-right downward slanting line differential amount calculating sections 45-1, 45-2, and 45-3 are output to a color image left-to-right downward slanting line differential amount/distance calculating section 55. The color image left-to-right downward slanting line differential amount/distance calculating section 55 calculates the distance between the windows W11 and W12 in a 3D color space, after the output values from the left-to-right downward slanting line/dot detecting sections 44 are subtracted and corrected, on the basis of the respective output values from the color image left-to-right downward slanting line differential amount calculating sections 45-1, 45-2, and 45-3. A color image left-to-right downward slanting line detecting/comparing section 56 compares an output value from the color image left-to-right downward slanting line differential amount/distance calculating section 55 with a threshold. If the output value is larger than the threshold, the color image left-to-right downward slanting line detecting/comparing section 56 determines that the target pixel a or its neighboring pixel is a left-to-right downward slanting line image, and sets the output value "1". If the output value is equal to or smaller than the threshold, the color image left-to-right downward slanting line detecting/comparing section 56 determines that the pixel is not a left-to-right downward slanting line image, and sets the output value to "0".

Left-to-right upward slanting line detection will be described next with reference to FIG. 6B. Left-to-right upward slanting line detecting/upper left oblique portion averaging sections 46-1, 46-2, and 46-3 are provided in correspondence with the color components C1, C2, and C3 of the input image, and execute the same processing as that executed by the left-to-right upward slanting line detecting/upper left oblique portion averaging section 16 (FIG. 1) with respect to the corresponding color components. For example, the left-to-right upward slanting line detecting/upper left oblique portion averaging section 46-1 sets a window W16 on the upper left oblique side of the target pixel a in the color component C1 of the input image, and calculates the weighted average of the pixel values in the window W16.

Left-to-right upward slanting line detecting/lower right oblique portion averaging sections 47-1, 47-2, and 47-3 are provided in correspondence with the color components C1, C2, and C3 of the input image, and execute the same processing as that executed by the left-to-right upward slanting line detecting/lower right oblique portion averaging section 17 (FIG. 1) with respect to the corresponding color components. For example, the left-to-right upward slanting line detecting/lower right oblique portion averaging section 47-1 sets a window W17 on the lower right oblique side of the target pixel a in the color component C1 of the input image, and calculates the weighted average of the pixel values in the window W17.

Left-to-right upward slanting line detecting/differentiating sections 48-1, 48-2, and 48-3 are provided in correspondence with the color components C1, C2, and C3 of the input image, and execute the same processing as that executed by the left-to-right upward slanting line detecting/differentiating section 18 (FIG. 1) with respect to the corresponding color components. For example, the left-to-right upward slanting line detecting/differentiating section 48-1 calculates the absolute value of the difference between an output value from the left-to-right upward slanting line detecting/upper left oblique portion averaging section 46-1 and an output value from the left-to-right upward slanting line detecting/lower right oblique portion averaging section 47-1.

Left-to-right upward slanting line/dot detecting sections 49-1, 49-2, and 49-3 are provided in correspondence with the color components C1. C2, and C3 of the input image, and execute the same processing as that executed by the left-to-right upward slanting line/dot detecting section 19 (FIG. 1) with respect to the corresponding color components. For example, the left-to-right upward slanting line/dot detecting section 49-1 sets a window W19 containing the target pixel a in the color component C1 of the input image, and calculates the average of the absolute values of differential values between left and right pixels in the window W19.

Color image left-to-right upward slanting line differential amount calculating sections 50-1, 50-2, and 50-3 are provided in correspondence with the color components C1, C2, and C3. The color image left-to-right upward slanting line differential amount calculating section 50-1 subtracts an output value from the left-to-right upward slanting line/dot detecting section 49-1 from an output value from the left-to-right upward slanting line detecting/differentiating section 48-1. The color image left-to-right upward slanting line differential amount calculating section 50-2 subtracts an output value from the left-to-right upward slanting line/dot detecting section 49-2 from an output value from the left-to-right upward slanting line detecting/differentiating section 48-2. The color image left-to-right upward slanting line differential amount calculating section 50-3 subtracts an output value from the left-to-right upward slanting line/dot detecting section 49-3 from an output value from the left-to-right upward slanting line detecting/differentiating section 48-3. The subtraction results obtained by the color image left-to-right upward slanting line differential amount calculating sections 50-1, 50-2 and 50-3 are output to a color image left-to-right upward slanting line differential amount/distance calculating section 57.

The color image left-to-right upward slanting line differential amount/distance calculating section 57 calculates the distance between the windows W16 and W17 in a 3D color space, after the output value from the left-to-right upward slanting line/dot detecting section 49-3 is subtracted and corrected, on the basis of the respective output values from the color image left-to-right upward slanting line differential amount calculating sections 50-1, 50-2, and 50-3. A color image left-to-right upward slanting line detecting/comparing section 58 compares an output value from the color image left-to-right upward slanting line differential amount/distance calculating section 57 with a threshold. If the output value is larger than the threshold, the color image left-toright upward slanting line detecting/comparing section 58 determines that the target pixel a or its neighboring pixel is a left-to-right upward slanting line image, and sets the output value "1". If the output value is equal to or smaller than the threshold, the color image left-to-right upward slanting line detecting/comparing section 58 determines that the pixel is not a left-to-right upward slanting line image, and sets the output value to "0".

If a line image is detected by at least one of the color image vertical line detecting/comparing section 52, color image horizontal line detecting/comparing section 54, detecting/comparing section 56, and color image left-to-right upward slanting line detecting/comparing section 58, a color image line segment detecting/synthesizing section 59 determines that the target pixel f or its neighboring pixel is a line image. If no line image is detected by at least one of the color image vertical line detecting/comparing section 52, color image horizontal line detecting/comparing section 54, detecting/comparing section 56, and color image left-to-right upward slanting line detecting/comparing section 58, the color image line segment detecting/synthesizing section 59 determines that the target pixel a or its neighboring pixel is a surface image.

More specifically, the color image line segment detecting/synthesizing section 59 calculates the logical OR between output values from the comparing sections 52, 54, 56, and 58. If at least one of these output values is "1", the color image line segment detecting/synthesizing section 59 outputs an output value "1" indicating a line segment image. If all the output values from the comparing sections 52, 54, 56, and 58 are "0", the color image line segment detecting/synthesizing section 59 outputs an output value "0" indicating a surface image.

Note that the color image line segment detecting/synthesizing section 59 calculates the logical OR between output values from the comparing sections 52, 54, 56, and 58. However, the color image line segment detecting/synthesizing section 59 may calculate the logical OR between output values from the comparing sections 52 and 54, i.e., the logical OR between a vertical line detection result and a horizontal line detection result.

In each embodiment described above the target pixel a in the input image is fixed. In actual processing, however, after a logical OR is calculated by the line segment detecting/synthesizing section 21 or color image line segment detecting/synthesizing section and line segment detection is completed, the target pixel a is shifted by one pixel and line segment detection is performed again. The scanning operation of performing line segment detection while moving the target pixel a pixel by pixel may be performed for all the pixels in the input image.

The line segment detector according to each embodiment described above can be implemented by hardware, software, or a combination thereof.

As has been described above, according to the present invention, the absolute value of a differential value after low-pass filter processing is obtained by the vertical line detecting/left portion averaging section vertical line detecting/right portion averaging section, and vertical line detecting/differentiating section. The average of the absolute values of differential values between pixels before low-pass filter processing is obtained in a direction parallel to a vertical line by the vertical line/dot detecting section. When the average of the absolute values of the differential values between the pixels before low-pass filter processing is subtracted from the absolute value of the differential value, the subtraction result varies in value depending on whether the target pixel is a dot or line segment. This makes it possible to separate a dot from a vertical line segment by threshold processing performed by the vertical line detecting/comparing section.

This detector can therefore correctly detect small vertical lines even in an image having both dots and line segments without responding to any dots. In addition, line segment detection can be performed at high speed, and hence the detector can be applied to a high-speed copying machine or facsimile apparatus. This is because, the detector can be realized in the form of an LSI circuit since line memories can be implemented by a raster scanning scheme corresponding to about six lines, and the operation speed of the LSI circuit can be increased in the absence of feedback control. If feedback control on a pixel or block basis is required, parallel processing cannot be performed, and the operation speed cannot be increased beyond the execution time for feedback control.

The absolute value of a differential value after low-pass filter processing is obtained by the horizontal line detecting/upper portion averaging section, horizontal line detecting/lower portion averaging section, and horizontal line detecting/differentiating section. The average of the absolute values of differential values between pixels before low-pass filter processing is obtained in a direction parallel to a horizontal line by the horizontal line/dot detecting section. When the average of the absolute values of the differential values between the pixels before low-pass filter processing is subtracted from the absolute value of the differential value, the subtraction result varies in value depending on whether the target pixel is a dot or line segment. This makes it possible to separate a dot from a horizontal line segment by threshold processing performed by the horizontal line detecting/comparing section.

This detector can therefore correctly detect small horizontal lines even in an image having both dots and line segments without responding to any dots. In addition line segment detection can be performed at high speed.

The absolute value of a differential value after low-pass filter processing is obtained by the left-to-right downward slanting line detecting/lower left oblique portion averaging section, left-to-right downward slanting line detecting/upper right oblique portion averaging section, and left-to-right downward slanting line detecting/differentiating section. The average of the absolute values of differential values between pixels before low-pass filter processing is obtained in a direction parallel to a left-to-right downward slanting line by the left-to-right downward slanting line/dot detecting section. When the average of the absolute values of the differential values between the pixels before low-pass filter processing is subtracted from the absolute value of the differential value, the subtraction result varies in value depending on whether the target pixel is a dot or line segment. This makes it possible to separate a dot from a left-to-right downward slanting line by threshold processing performed by the left-to-right downward slanting line detecting/comparing section.

This detector can therefore correctly detect small left-to-right downward slanting lines even in an image having both dots and line segments without responding to any dots. In addition, line segment detection can be performed at high speed.

The absolute value of a differential value after low-pass filter processing is obtained by the left-to-right upward slanting line detecting/upper left oblique portion averaging section, left-to-right upward slanting line detecting/lower right oblique portion averaging section, and left-to-right upward slanting line detecting/differentiating section. The average of the absolute values of differential values between pixels before low-pass filter processing is obtained in a direction parallel to a left-to-right upward slanting line by the left-to-right upward slanting line/dot detecting section. When the average of the absolute values of the differential values between the pixels before low-pass filter processing is subtracted from the absolute value of the differential value, the subtraction result varies in value depending on whether the target pixel is a dot or line segment. This makes it possible to separate a dot from a left-to-right upward slanting line by threshold processing performed by the left-to-right upward slanting line detecting/comparing section.

This detector can therefore correctly detect small left-to-right upward slanting lines even in an image having both dots and line segments without responding to any dots. In addition, line segment detection can be performed at high speed.

The vertical line detecting/left portion averaging sections, vertical line detecting/right portion averaging sections, vertical line detecting/differentiating sections, vertical line/dot detecting sections, and color image vertical line differential amount calculating sections are provided for the respective axes in a color space. In addition, the vertical line differential amount/distance calculating section and vertical line detecting/comparing section are provided. This arrangement makes it possible to correctly detect small vertical lines even in a color image having both dots and line segments without responding to any dots.

The horizontal line detecting/upper portion averaging sections, horizontal line detecting/lower portion averaging sections, horizontal line detecting/differentiating sections, horizontal line/dot detecting sections, and horizontal line differential amount calculating sections are provided for the respective axes in a color space. In addition, the horizontal line differential amount/distance calculating section and horizontal line detecting/comparing section are provided. This arrangement makes it possible to correctly detect small horizontal lines even in a color image having both dots and line segments without responding to any dots.

The left-to-right downward slanting line detecting/lower left oblique portion averaging sections, left-to-right downward slanting line detecting/upper right oblique portion averaging sections, left-to-right downward slanting line detecting/differentiating sections, left-to-right downward slanting line/dot detecting sections, and left-to-right downward slanting line differential amount calculating sections are provided for the respective axes in a color space. In addition, the left-to-right downward slanting line differential amount/distance calculating section and left-to-right downward slanting line detecting/comparing section are provided. This arrangement makes it possible to correctly detect small left-to-right downward slanting lines even in a color image having both dots and line segments without responding to any dots.

The left-to-right upward slanting line detecting/lower left oblique portion averaging sections, left-to-right upward slanting line detecting/upper right oblique portion averaging sections, left-to-right upward slanting line detecting/differentiating sections, left-to-right upward slanting line/dot detecting sections, and left-to-right upward slanting line differential amount calculating sections are provided for the respective axes in a color space. In addition, the left-to-right downward slanting line differential amount/distance calculating section and left-to-right downward slanting line detecting/comparing section are provided. This arrangement makes it possible to correctly detect small left-to-right upward slanting lines even in a color image having both dots and line segments without responding to any dots.

What is claimed is:

1. A line segment detector comprising:

first weighted average means for calculating a weighted average of pixel values in a first detection window set in a first neighboring area of a target pixel in an input image;

second weighted average means for calculating a weighted average of pixel values in a second detection window set in a second neighboring area point symmetrical with the first neighboring area with respect to the target pixel;

differentiating means for calculating an absolute value of a difference between outputs from said first and second weighted average means;

dot detecting means for calculating an average of absolute values of differential values between pixels in a direction of at least one of a vertical line, horizontal line, left-to-right downward slanting line, and left-to-right upward slanting line within a third detection window set in an area containing the target pixel: and comparing means for, if a subtraction result obtained by subtracting an output from said dot detecting means from an output from said differentiating means is larger than a predetermined threshold, determining that a portion near the target pixel is one of a vertical line image, horizontal line image, left-to-right downward slanting line image, and left-to-right upward slanting line image.

2. A detector according to claim 1, wherein the first neighboring area is set near a left side of the target pixel;

the second neighboring area is set near a right side of the target pixel, and said comparing means determines, if the subtraction result is larger than a predetermined threshold, that the portion near the target pixel is a vertical line image.

3. A detector according to claim 1, wherein the first neighboring area is set near an upper side of the target pixel;

the second neighboring area is set near a lower side of the target pixel, and said comparing means determines, if the subtraction result is larger than a predetermined threshold, that the portion near the target pixel is a horizontal line image.

4. A detector according to claim 1, wherein the first neighboring area is set near a lower left oblique side of the target pixel;

the second neighboring area is set near an upper right oblique side of the target pixel, and said comparing means determines, if the subtraction result is larger than a predetermined threshold, that the portion near the target pixel is a left-to-right downward slanting line image.

5. A detector according to claim 1, wherein the first neighboring area is set near an upper left oblique side of the target pixel;

the second neighboring area is set near an lower right oblique side of the target pixel, and said comparing means determines, if the subtraction result is larger than a predetermined threshold that the portion near the target pixel is a left-to-right upward slanting line image.

6. A detector according to claim 1, wherein said line segment detector further comprises line segment detecting/synthesizing means for calculating a logical OR between a vertical line detection output and horizontal line detection output from said comparing means, and said comparing means comprises a vertical line detecting/comparing section which determines that a portion near the target pixel is a vertical line image, and outputs a vertical line detection output to said line segment detecting/synthesizing means, and a horizontal line detecting/comparing section which determines that a portion near the target pixel is a horizontal line image, and outputs a horizontal line detection output to said line segment detecting/synthesizing means.

7. A detector according to claim 1, wherein said line segment detector further comprises line segment detecting/synthesizing means for calculating a logical OR between the vertical line detection output, horizontal line detection output, left-to-right downward slanting line detection output! and left-to-right upward slanting line detection output from said comparing means, and said comparing means comprises a vertical line detecting/comparing section which determines that a portion near the target pixel is a vertical line image, and outputs a vertical line detection output to said line segment detecting/synthesizing means;

a horizontal line detecting/comparing section which determines that a portion near the target pixel is a horizontal line image, and outputs a horizontal line detection output to said line segment detecting/synthesizing means;

a left-to-right downward slanting line detecting/comparing section which determines that a portion near the target pixel is a left-to-right downward slanting line image, and outputs a left-to-right downward slanting line detection output to said line segment detecting/synthesizing means; and a left-to-right upward slanting line detecting/comparing section which determines that a portion near the target pixel is a left-to-right upward slanting line image, and outputs a left-to-right upward slanting line detection output to said line segment detecting/synthesizing means.

8. A detector according to claim 1, wherein the first and second neighboring areas are set adjacent to each other.

9. A line segment detector comprising:

a plurality of first weighted average means, respectively provided for color components, for calculating weighted averages of pixel values in first detection windows set in a first neighboring area of a target pixel in a color input image;

a plurality of second weighted average means, respectively provided for color components, for calculating weighted averages of pixel values in second detection windows set in a second neighboring area point symmetrical with the first neighboring area with respect to the target pixel;

a plurality of differentiating means, respectively provided for the color components, for calculating absolute values of differences between outputs from said first and second weighted average means;

a plurality of dot detecting means, respectively provided for the color components, for calculating averages of absolute values of differential values between pixels in a direction of at least one of a vertical line, horizontal line, left-to-right downward slanting line, and left-to-right upward slanting line within third detection windows set in an area containing the target pixel;

a plurality of differential amount calculating means, respectively provided for the color components, for subtracting outputs from said dot detecting means from outputs from said differentiating means;

differential amount/distance calculating means for calculating a distance between the first and second detection windows in a color space on the basis of outputs from said differential amount calculating means; and comparing means for, if an output from said differential amount/distance calculating means is larger than a predetermined threshold, determining that a portion near the target pixel is one of a vertical line image, horizontal line image, left-to-right downward slanting line image, and left-to-right upward slanting line image.

10. A detector according to claim 9, wherein the first neighboring area is set near a left side of the target pixel;

the second neighboring area is set near a right side of the target pixel, and said comparing means determines, if the subtraction result is larger than a predetermined threshold, that the portion near the target pixel is a vertical line image.

11. A detector according to claim 9, wherein the first neighboring area is set near an upper side of the target pixel:

the second neighboring area is set near a lower side of the target pixel, and said comparing means determines, if the subtraction result is larger than a predetermined threshold, that the portion near the target pixel is a horizontal line image.

12. A detector according to claim 9, wherein the first neighboring area is set near a lower left oblique side of the target pixel;

the second neighboring area is set near an upper right oblique side of the target pixel, and said comparing means determines, if the subtraction result is larger than a predetermined threshold that the portion near the target pixel is a left-to-right downward slanting line image.

13. A detector according to claim 9, wherein the first neighboring area is set near an upper left oblique side of the target pixel;

the second neighboring area is set near an lower right oblique side of the target pixel, and said comparing means determines, if the subtraction result is larger than a predetermined threshold, that the portion near the target pixel is a left-to-right upward slanting line image.

14. A detector according to claim 9, wherein said line segment detector further comprises line segment detecting/synthesizing means for calculating a logical OR between a vertical line detection output and horizontal line detection output from said comparing means, and said comparing means comprises a vertical line detecting/comparing section which determines that a portion near the target pixel is a vertical line image and outputs a vertical line detection output to said line segment detecting/synthesizing means, and a horizontal line detecting/comparing section which determines that a portion near the target pixel is a horizontal line image, and outputs a horizontal line detection output to said line segment detecting/synthesizing means.

15. A detector according to claim 9, wherein said line segment detector further comprises line segment detecting/synthesizing means for calculating a logical OR between the vertical line detection output, horizontal line detection output, left-to-right downward slanting line detection output, and left-to-right upward slanting line detection output from said comparing means, and said comparing means comprises a vertical line detecting/comparing section which determines that a portion near the target pixel is a vertical line image, and outputs a vertical line detection output to said line segment detecting/synthesizing means;

a horizontal line detecting/comparing section which determines that a portion near the target pixel is a horizontal line image, and outputs a horizontal line detection output to said line segment detecting/synthesizing means;

a left-to-right downward slanting line detecting/comparing section which determines that a portion near the target pixel is a left-to-right downward slanting line image, and outputs a left-to-right downward slanting line detection output to said line segment detecting/synthesizing means; and a left-to-right upward slanting line detecting/comparing section which determines that a portion near the target pixel is a left-to-right upward slanting line image, and outputs a left-to-right upward slanting line detection output to said line segment detecting/synthesizing means.

16. A detector according to claim 9, wherein the first and second neighboring areas are set adjacent to each other.

* * * * *